(12) United States Patent
Goertzen (10) Patent No.: US 6,718,065 B1
(45) Date of Patent: Apr. 6, 2004

(54) OPTIMIZED SIGNAL QUANTIFICATION

(75) Inventor: Kenbe D. Goertzen, Topeka, KS (US)

(73) Assignee: QuVIS, Inc., Topeka, KS (US)

( * ) Notice: Subject to any disclaimer, the term of this patent is extended or adjusted under 35 U.S.C. 154(b) by 0 days.

(21) Appl. No.: 09/499,091

(22) Filed: Feb. 4, 2000

Related U.S. Application Data (60) Provisional application No. 60/118,555, filed on Feb. 4, 1999.

(51) Int. Cl.⁷ .................................................. G06K 9/36
(52) U.S. Cl. ...................................................... 382/240
(58) Field of Search ................................ 382/232, 233, 382/236, 238, 240, 246, 248, 250; 348/384.1, 394.1, 395.1, 400.1–404.1, 407.1–416.1, 420.1–421.1, 425.2, 430.1, 431.1; 375/240.02–240.03, 240.11–240.16, 240.18–240.2, 240.22–240.25; 341/51, 63, 65, 67, 107; 364/724.011, 724.04, 724.05, 724.13, 724.14, 725.1–725.2

(56) References Cited

U.S. PATENT DOCUMENTS

| | | | | |
|---|---|---|---|---|
| 5,748,786 | A | * 5/1998 | Zandi et al. | 382/240 |
| 6,141,446 | A | * 10/2000 | Boliek et al. | 382/233 |
| 6,195,465 | B1 | * 2/2001 | Zandi et al. | 382/248 |
| 6,219,458 | B1 | * 4/2001 | Zandi et al. | 382/248 |
| 6,222,941 | B1 | * 4/2001 | Zandi et al. | 382/232 |
| 6,337,929 | B1 | * 1/2002 | Kajiwara et al. | 382/239 |

* cited by examiner

Primary Examiner—Jose L. Couso
(74) Attorney, Agent, or Firm—Bromberg & Sunstein LLP (57) ABSTRACT

A method for optimizing signal quantification comprising applying reversible filters to the signal in order to pre-quantify the signal as a continuous function of the frequency domain; pre-processing the signal in order to place it in the proper colorspace and frequency domain; applying subband transforms to the signal in order to split the signal into frequency regions; and entropy coding the signal. Additionally filters and steps are also provided that enable improved quantification of the signal resulting in improved compression of the resulting signal.

12 Claims, 7 Drawing Sheets

OPTIMIZED SIGNAL QUANTIFICATION

This application claims the benefit of Provisional Application No. 60/118,555, filed Feb. 4, 1999.

RELATED APPLICATION

The subject matter of this application is related to the subject matter of the following commonly owned applications: Ser. No. 09/112,668 now U.S. Pat. No. 6,278,160, titled "Apparatus And Method For Entropy Coding", filed on Jul. 9, 1998, also by Kenbe Goertzen; Ser. No. 09/498,323, titled "Scalable Resolution Motion Image Recording And Storage System", filed concurrently", also by Kenbe Goertzen; Ser. No. 09/498,925 now U.S. Pat. No. 6,636,643, titled "A System And Method For Improving Compressed Image Appearance Using Stochastic Resonance And Energy Replacement", filed concurrently", also by Kenbe Goertzen; Ser. No. 09/498,924 now U.S. Pat. No. 6,532,308, titled "Quality Priority Image Storage and Communication", filed concurrently", also by Kenbe Goertzen; the contents of which are incorporated by reference as if fully disclosed herein.

TECHNICAL FIELD

This invention pertains to the field of digital signal compression and quantification. More specifically, the present invention related to a method for optimizing signal quantification, particularly the quantification of signals transmitting still and motion image components.

SHORTCOMINGS OF PRIOR ART

Multiband compression methods have generally divided a signal into frequency components and then used some method to quantify the values in each of the frequency bands in order to represent the desired signal quality. Some of the problems with this approach include:

1. Only a small number of frequency bands are used so the regional quantification method is a less than optimal coarse approximation of the desired function.

2. Unequal quantification of neighboring frequency bands generally increases the amount of aliasing in the reconstruction mechanism.

3. Many quantification methods can generate undesirable artifacts in various degenerate cases.

4. Quantification as a separate process adds time or hardware to the implementation.

5. Quantification as a separate process can add additional noise.

What is needed is a system and method for quantifying one or more signals in an image stream such that the method can be easily implemented while offering better coding efficiency and more degrees of freedom in designing subband filters.

SUMMARY OF INVENTION

Wavelet compression of images generally consists of subband transforms of an image into frequency regions. These regions are then quantified to relative resolutions and entropy coded. The present invention uses a continuous and frequency specific function to quantify the regions rather than a regional approximation.

More specifically, the method uses reversible filters before and after signal quantification as a continuous function of the frequency domain. This allows the scaling function to be either the exact desired function, or more closely approximate the desired continuous quantification function. It also allows the characteristics of any quantification and aliasing artifacts to be tailored to the particular application. As a result, the present invention provides better interpolation of quantification errors resulting in less noticeable artifacts in the quantified stream. The present invention also provides lower aliasing energy between subbands.

BRIEF DESCRIPTION OF THE DRAWINGS

These and other more detailed and specific objects and features of the present invention are more fully disclosed in the following specification, reference being had to the accompanying drawings in which.

DETAILED DESCRIPTION

Wavelet compression of images generally consists of subband transforms of an image into frequency regions. These regions are then quantified to relative resolutions and entropy coded. Although the method will be described in terms of steps, the steps involving application of the quantification and inverse quantification functions to the signal can also be incorporated directly into the subband analysis and synthesis filters thus avoiding a separate quantification and dequantification step.

Figure 1:
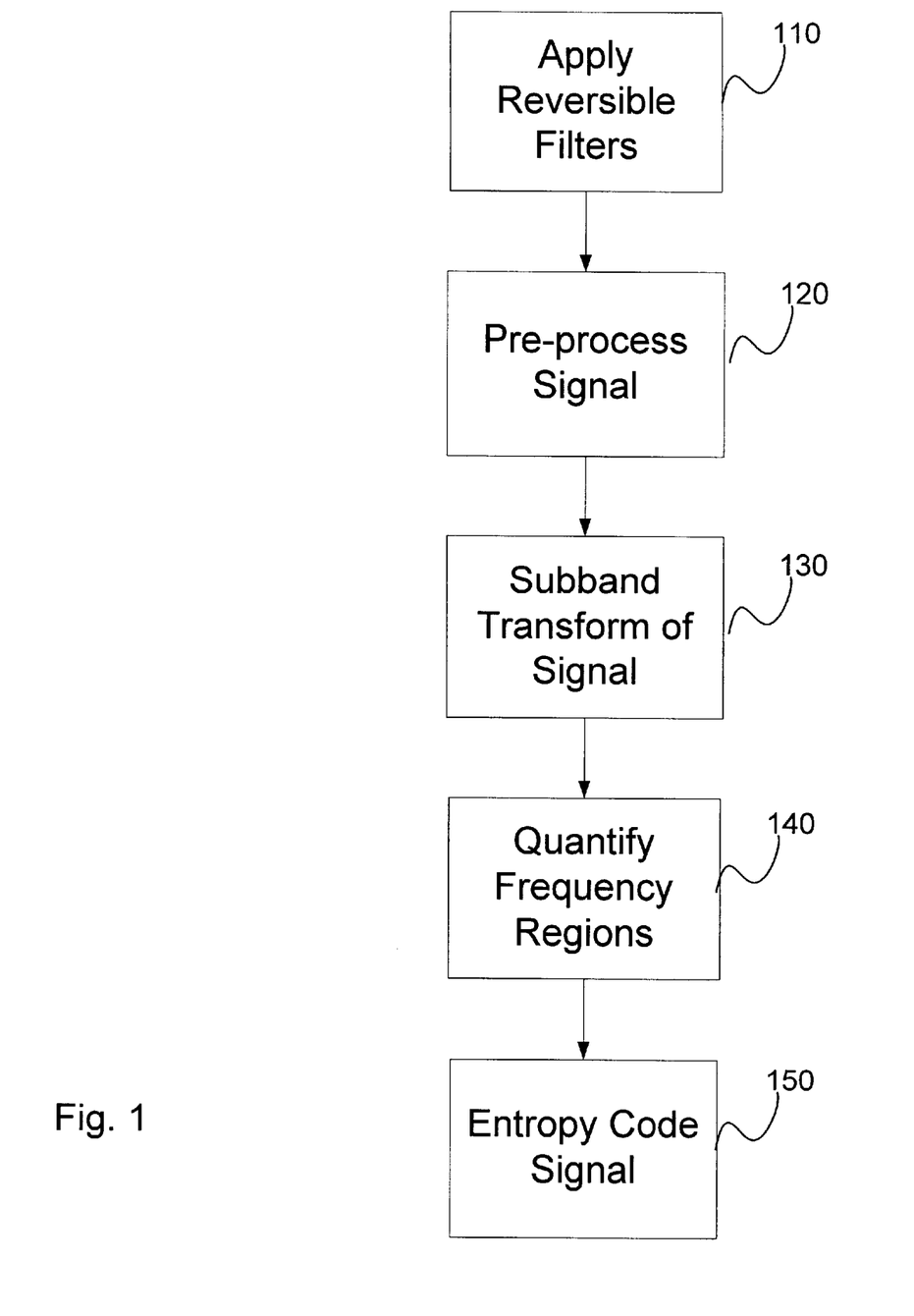
FIG. 1 is a flowchart illustrating the preferred method of the present invention.

Referring now to FIG. 1, the method of the present invention is shown. In a first embodiment, the method begins by applying 110 reversible filters to the signal in order to pre-quantify the signal as a continuous function of the frequency domain. This allows the scaling function to be either the exact desired function, or more closely approximate the desired continuous quantification function. It also allows the characteristics of any quantification and aliasing artifacts to be tailored to the specific application or signal.

After filtering the signal, the signal is pre-processed 120. This might include performing any number of different processes on the signal, such as converting the colorspace. Other forms of preprocessing may be applied depending on the type of signal and the desired output. In step 130, subband transforms of the signal split the signal into frequency regions. This enables quantification of the signal by region.

While the region quantification step is described as a separate step from subband transforms, these two steps may be combined into a single step if desired. In this step 140, each region is separately quantified. In the preferred embodiment of the present invention, a continuous function is used to quantify the frequency regions. This can provide a significant improvement in efficiency over a stepwise approximation, as well as a reduction in aliasing. Finally, the quantified signal is subjected to entropy coding resulting in maximum compression. In the preferred embodiment, the step of entropy coding is performed in accordance with the entropy coding method described in the related application entitled, "Apparatus and Method for Entropy Coding."

An important application of this method is still and motion image encoding. Images are often sampled as discrete x,y or x,y,z grids of digital values. If these values are linearized with uncorrelated noise, then sampling theory indicates that as the frequency of interest is reduced from the Nyquest frequency, the signal resolution increases. It is desirable to quantify the transformed image to a curve matching the resolution function established by sampling theory. This function in one dimension is:

resolution=(1/frequency)^0.5*Nyquest resolution where frequency is in the range of {0.1} where 1 represents the Nyquest frequency The separable n dimensional case is:

resolution=(product from 1 to $n$ of (1/$Fn$)^0.5)*Nyquest resolution

Subband image coders typically quantify the subbands using a stepwise approximation of this function to obtain acceptable images after compression. If a continuous function is used for the quantification, it can provide a significant improvement in efficiency over a stepwise approximation, as well as a reduction in aliasing. Reversible quantification filter functions can also be developed to provide other types of continuous quantification functions other than those provided by sampling theory. An example would be a continuous quantification function matching human perception resolution.

Even in cases where an exact continuous filter and its inverse cannot be designed for the desired quantification function, benefit from the method can be obtained by treating the desired function as a lower bound and designing a filter and its inverse which are bounded by the desired continuous function but better than a stepwise approximation by region.

The greater the dynamic range required of the quantification filter and its inverse, the more difficult they are to design. This problem can be solved by dividing the range into regions combined with the subband transform process. Once the range has been divided, a family of filters may be used to approximate the desired continuous function. Alternatively, a single filter can be used recursively.

If the subband mechanism has adequate resolution, the subband filters can be convolved with the quantification filters to combine the transform steps. In a preferred embodiment, the quantification filter design is combined with the subband filter design to increase the degrees of freedom for design of the subband filters. This would enable one to design a subband filter in a similar fashion to biorthagonal filter design.

Subband transforms may also be applied separately by dimension. If subband transforms are to be applied separately by dimension, then the type of transform is determined by the desire to generate a smooth and continuous quantification function matching the resolution specified by sampling theory. This requires that only the low frequency halfband from each bandsplit be further subdivided.

In the case of two or more dimensions, this requires a more complete transform than the typical pyramid subband transform. A two-dimensional two-band pyramid transform generates 7 regions, a complete transform of low frequencies by dimension generates 9 regions, and a full transform would generate 16. Non-separable multidimensional filters and subband transforms can then be designed which allow the generation of the smooth, continuous quantification function for a pyramid transform. While the above method was described as the preferred embodiment, the following embodiments represent alternative compression processing methods.

The following is an alternate set of steps for a Precompensation-based subband image compression process.

Step 1: preprocessing such as color space conversion
Step 2: precompensation filter matching sampling theory resolution (may be combined with transform)
Step 3: subband transform
Step 4: entropy coding The following is an alternate combined subband image compression process Step 1: preprocessing such as color space conversion
Step 2: subband transform matching sampling theory resolution
Step 3: entropy coding

EXAMPLES AND RELATED CALCULATIONS

Figure 2:
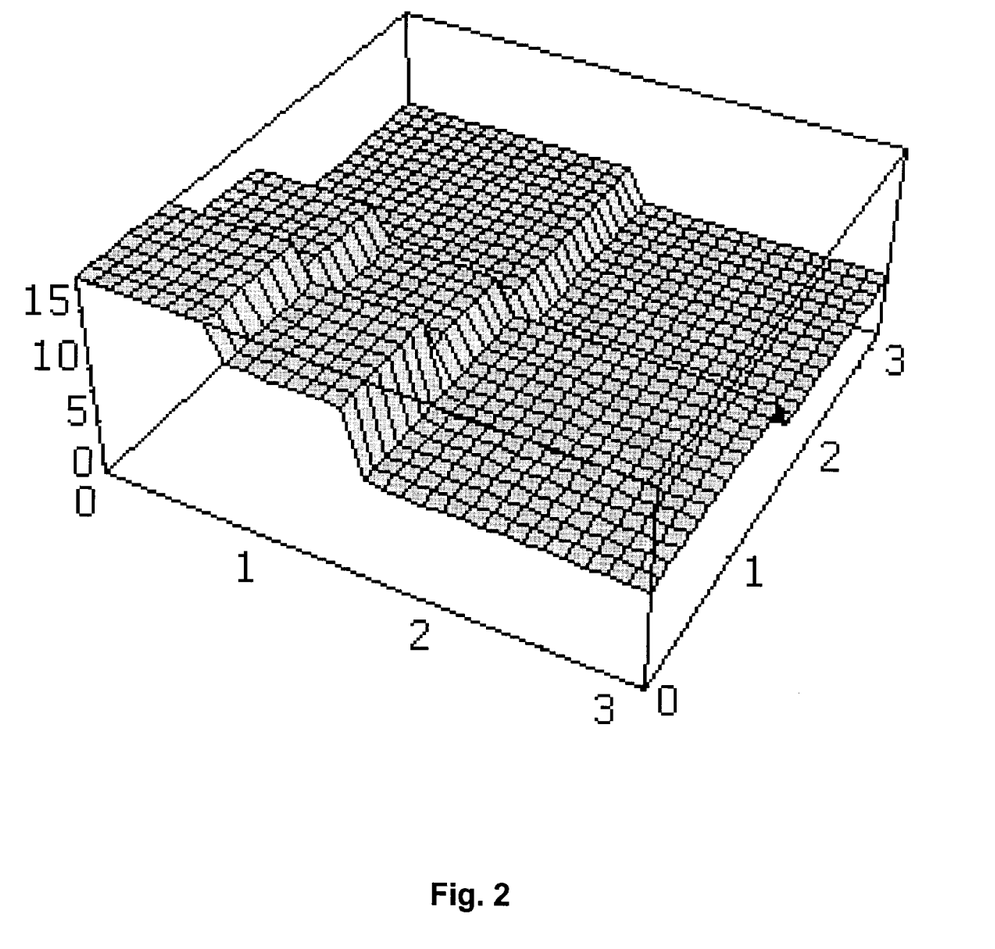
FIG. 2 is an example of a typical 2D quantification map for a 2 band pyramid transform.
Figure 3:
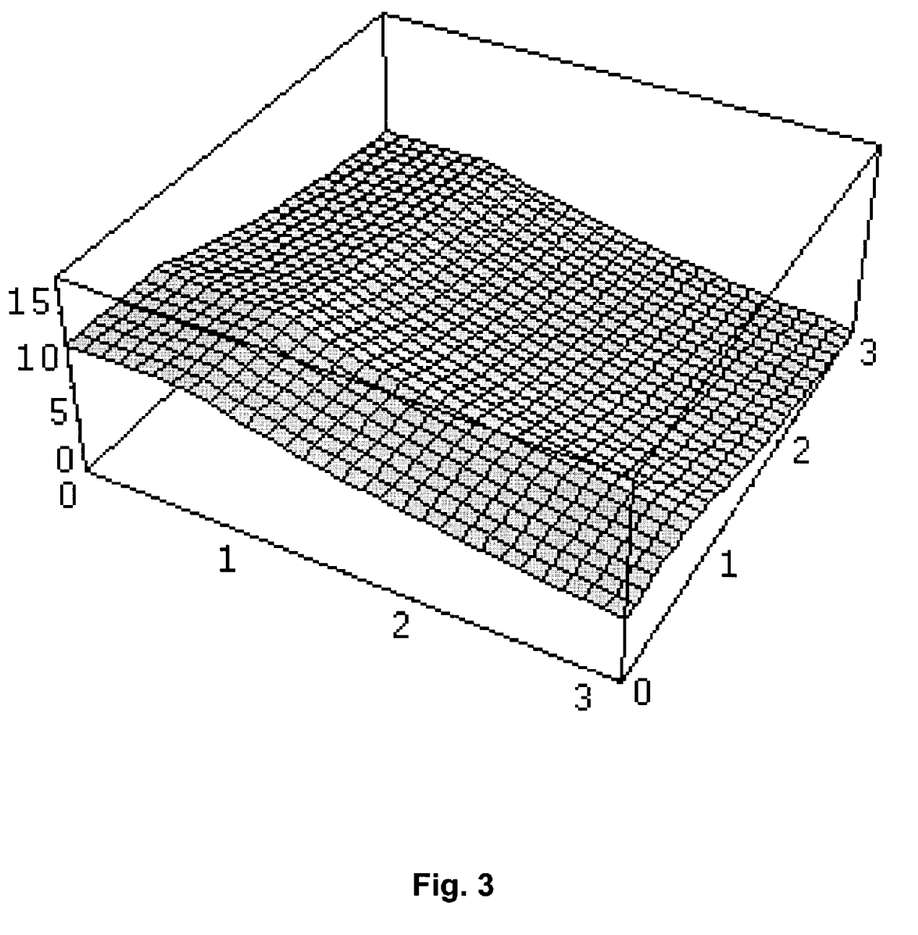
FIG. 3 is an example of an optimum quantification map for a separable complete 2 band transform.
Figure 4:
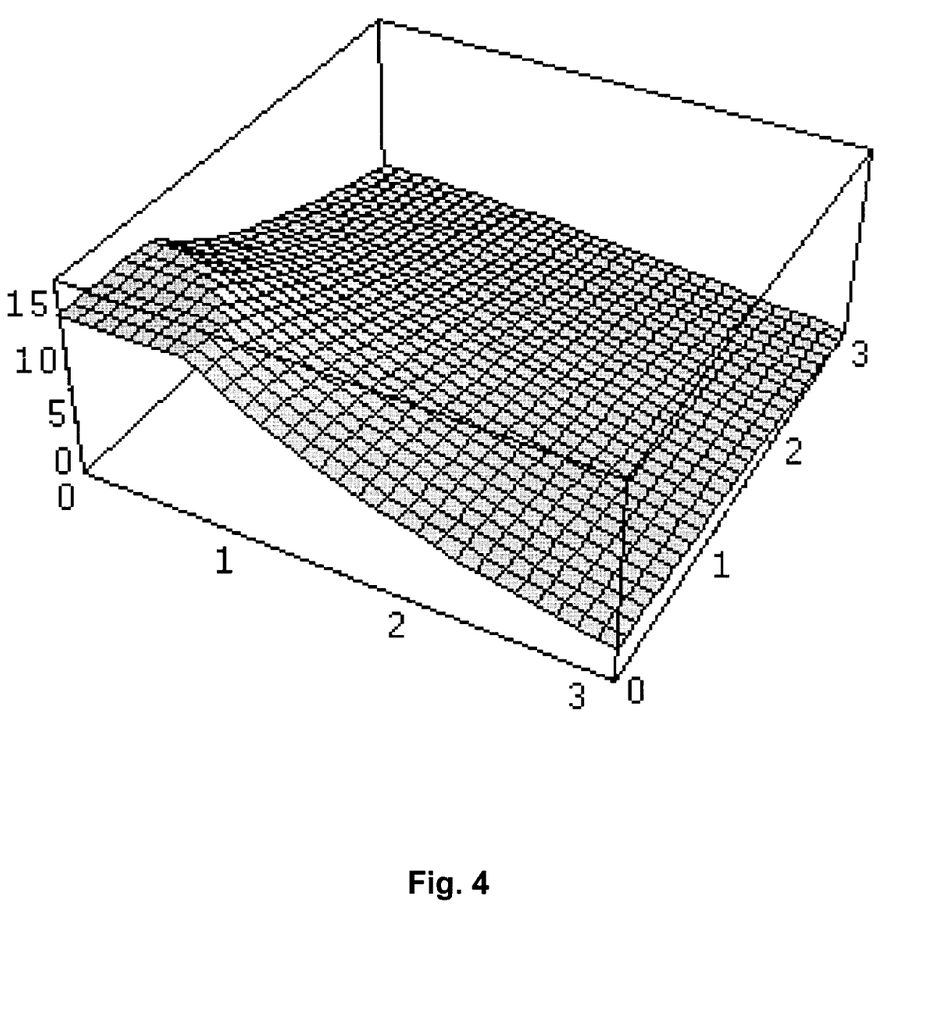
FIG. 4 is an example of an optimum quantification map for a non-separable complete 2 band transform.

The following three plots outline the difference for a quantification surface which will assure 0 dB of loss at the Nyquest frequency. Referring to FIG. 2, an example of a typical 2D quantification map for a 2 band pyramid transform is shown. The illustrated transform was generated by using the following plotting equation:

Plot3D[dB[$rs2b[x,y]$],{$x$,0,$Pi$},{$y$,0, $Pi$},PlotPoints→30, PlotRange→{0,18}];

Referring to FIG. 3, an example of an optimum quantification map for a separable complete 2 band transform is shown. The illustrated transform was generated by using the following plotting equation:

Plot3D[dB[$rc2b[x,y]$],{$x$,0,$Pi$},{$y$,0,$Pi$}, PlotPoints→30, PlotRange→{0,18}];

Referring now to FIG. 4, an example of an optimum quantification map for a non-separable complete 2 band transform is provided. The illustrated transform was generated by using the following plotting equation:

Plot3D[dB[$rr2b[x,y]$]+3,{$x$,0,$Pi$},{$y$,0,$Pi$}, PlotPoints→30, PlotRange→{0,18}]

Figure 5:
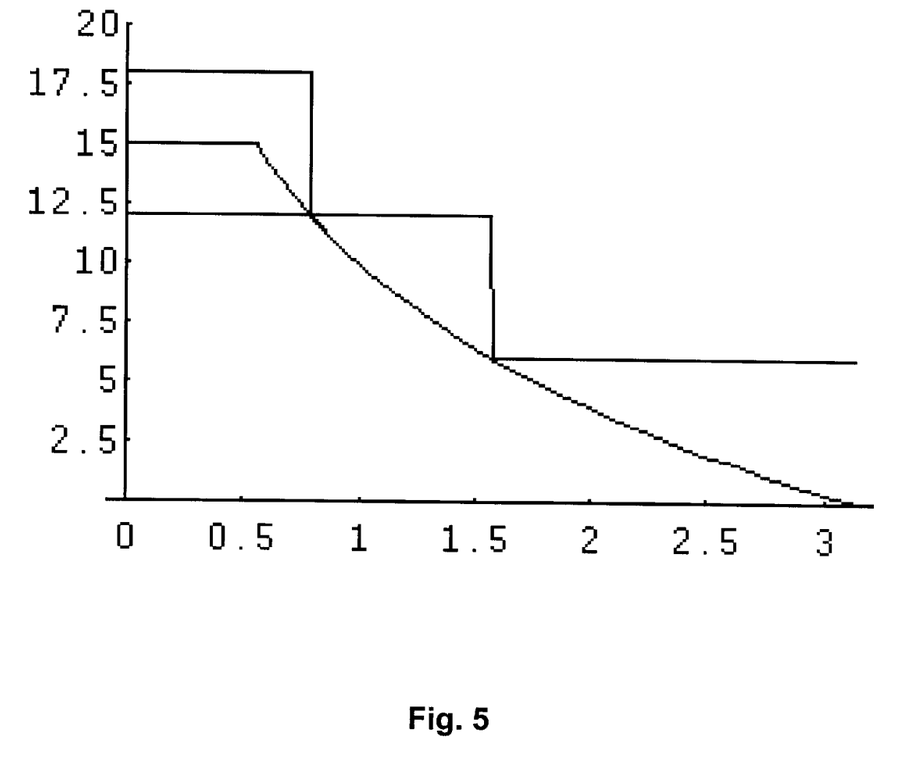
FIG. 5 is an example slice of the quantification surfaces demonstrating the advantages provided by the present invention.

Referring now to FIG. 5, an example slice of the quantification surfaces demonstrate the advantages provided by the present invention. The plot was generated using the following plotting equation:

Plot[{dB[$rs2b[x,x]$],dB[$rc2b[x,x]$],dB[$rr2b[x,x]$]+3},{$x$,0,$Pi$}, PlotRange→{0,20}

The following equations provide a method for calculating the non-separable and separable advantage over a stepwise approximation for a given channel resolution.

$N$[$N$Integrate[dB[$rs2b[x,y]$]]−(dB[$rr2b[x,y]$]+3),{$x$,0,$Pi$},{$y$,0,$Pi$}]/$Pi$^2]3.77673

$N$[$N$Integrate[dB[$rs2b[x,y]$]]−dB[$rc2b[x,y]$],{$x$,0,$Pi$},{$y$,0,$Pi$}]/$Pi$^2]3.25787

Figure 6A:
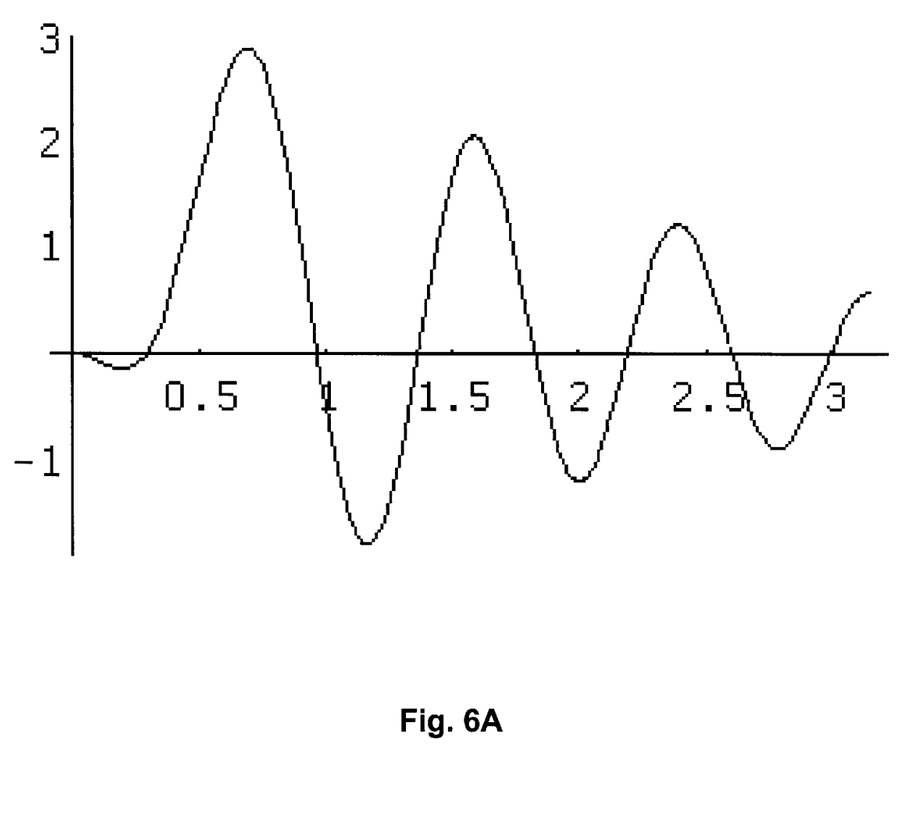
FIGS. 6A and 6B are examples of a bandsplit filter that was made more accurate by applying the method of optimum quantification.
Figure 6B:
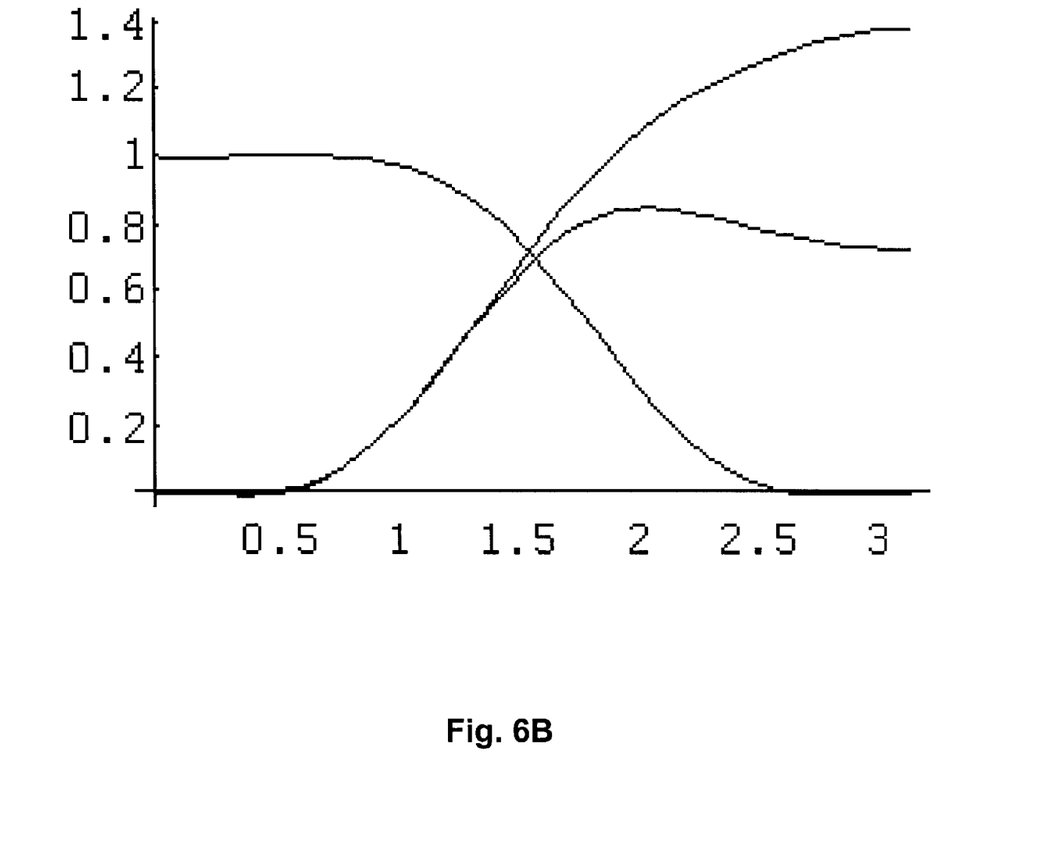

Referring now to FIGS. 6A and 6B, an example of a bandsplit filter which was made more accurate by applying the method of optimum quantification is shown. The variables used in the plotting equation are provided below.

tal={1168, 590, −106, −78, 34};
tsl={1168, 590, −106, −78, 34};
tah={990, −454+1, −166, 83−1, 42};
tsh={1390+6, −769, −18−3, 62, 30};

ralt[w_]:=Sum[Cos[n*w]*tal[[Abs[n]+1]],{n,−4,4}]/ (2048)

raht[w_]:=Sum[Cos[n*w]*tah[[Abs[n]+1]],{n,−4,4}]/ (2048)

rslt[w_]:=Sum[Cos[n*w]*tsl[[Abs[n]+1]],{n,−4,4}]/ (2048)

rsht[w_]:=Sum[Cos[n*w]*tsh[[Abs[n+1]],{n,−4,4}]/ (2048)

FIG. 6A was plotted using the following equation:

Plot[{(ralt[x]*rslt[x]+raht[x]*rsht[x]−1)*1000},{x,0,Pi}].

FIG. 6B was plotted using the following equation:

Plot[{ralt[x],raht[x],rslt[x],rsht[x]},{x,0,Pi}]

Although the description above contains many detailed descriptions, these descriptions should not be construed as limiting the scope of the invention but merely as providing illustrations of some of the presently preferred implementations of this invention. For example, although this method was described with reference to standard motion and still images, this method can be used to optimize quantification of any signal stream. Thus the scope of the invention should be determined by the appended claims and their legal equivalents, rather than by examples given.

I claim:

1. A method for optimizing signal quantification comprising:

applying reversible filters to the signal in order to quantify the signal so that quantization varies substantially continuously across frequencies and therefore varies within each frequency region such that each discrete quantized value may have a different quantization level as a function of a curve matching a resolution function established by sampling theory;

applying subband transforms to the signal wherein the signal is split into frequency regions; and entropy coding the signal.

2. The method of claim 1, further comprising pre-processing the signal, wherein the step of pre-processing the signal includes converting the colorspace of the signal.

3. The method of claim 1, wherein the step of applying reversible filters to the signal comprises using a quantification filter.

4. The method of claim 3, wherein the step of applying subband transforms includes using a subband filter.

5. The method of claim 1, wherein the step of applying reversible filters to the signal is combined with the step of applying subband transforms.

6. The method of claim 1, wherein the step of applying subband transforms includes applying the subband transforms separately by dimension.

7. The method of claim 1, wherein the method comprises the further step of calculating a quantification function that approximates the desired signal.

8. The method of claim 7, the method comprising the further step of:

designing an exactly continuous filter and its inverse for the calculated quantification function.

9. The method of claim 8 comprising the further step of:

responsive to an inability to design an exact continuous filter and its inverse for the quantification function, designing a filter and its inverse which are bounded by the desired continuous function wherein the desired function is used as a lower bound.

10. The method of claim 1, further comprising the step of dividing signal frequency range into regions created by the step of applying a subband transform to the signal.

11. The method of claim 10, further comprising the step of:

using a family of filters to approximated the desired continuous function.

12. The method of claim 10, further comprising the step of:

using a single filter recursively to approximate the desired continuous function.

* * * * *